US009791847B2

United States Patent
Ono

(10) Patent No.: US 9,791,847 B2
(45) Date of Patent: Oct. 17, 2017

(54) METHOD OF CALCULATING A STABLE SPINDLE ROTATION NUMBER AND AN APPARATUS FOR CALCULATING A STABLE SPINDLE ROTATION NUMBER

(71) Applicant: DMG MORI SEIKI CO., LTD., Nara (JP)

(72) Inventor: Katsuhiko Ono, Nara (JP)

(73) Assignee: DMG MORI SEIKI CO., LTD., Nara (JP)

( * ) Notice: Subject to any disclaimer, the term of this patent is extended or adjusted under 35 U.S.C. 154(b) by 279 days.

(21) Appl. No.: 14/716,479

(22) Filed: May 19, 2015

(65) Prior Publication Data

US 2015/0338842 A1   Nov. 26, 2015

(30) Foreign Application Priority Data

May 21, 2014   (JP) ................. 2014-104896

(51) Int. Cl.
*G05B 19/404*   (2006.01)

(52) U.S. Cl.
CPC .. *G05B 19/404* (2013.01); *G05B 2219/37434* (2013.01); *G05B 2219/41115* (2013.01);
(Continued)

(58) Field of Classification Search
CPC ........ G05B 19/404; G05B 2219/41256; G05B 2219/37434; G05B 2219/41115; G05B 2219/50041; G05B 2219/49108
See application file for complete search history.

(56) References Cited

U.S. PATENT DOCUMENTS 4,047,469 A * 9/1977 Sakata ............... B23Q 11/0039
                                                     408/143
8,532,811 B2 * 9/2013 Nishikawa ............. B23Q 17/20
                                                     700/174
(Continued)

FOREIGN PATENT DOCUMENTS

EP         2614922 A1   7/2013
JP      2013043240 A    3/2013

OTHER PUBLICATIONS

Eiji Shamoto, Mechanism and Suppression of Chatter Vibrations in Cutting, Technical Review, p. 143-155, 2011.
(Continued)

*Primary Examiner* — Ramesh Patel
(74) *Attorney, Agent, or Firm* — Miller, Matthias & Hull LLP

(57) ABSTRACT

An apparatus includes vibration data obtainer 30 obtaining data on vibration caused by a tool in cutting, a vibration frequency calculator 22 calculating a vibration frequency of the tool by analyzing the obtained vibration data, a regenerative chatter detector 23 detecting whether regenerative chatter occurs by comparing the calculated vibration frequency of the tool with a spindle rotation number, and a spindle rotation controller 24 gradually decreasing or increasing the spindle rotation number when occurrence of regenerative chatter vibration is detected, and a stable rotation number calculator 25 monitoring variation of the vibration frequency of the tool and determining a spindle rotation number when the variation of the vibration frequency exceeds a predetermined reference value to be a stable rotation number.

14 Claims, 4 Drawing Sheets

(52) U.S. Cl.
CPC .............. *G05B 2219/41256* (2013.01); *G05B 2219/49108* (2013.01); *G05B 2219/50041* (2013.01)

(56) References Cited

U.S. PATENT DOCUMENTS

| | | | | |
|---|---|---|---|---|
| 2002/0146296 A1* | 10/2002 | Schmitz | ............. | B23Q 17/0976 409/131 |
| 2009/0069927 A1* | 3/2009 | Suzuki | ............. | B23Q 11/0039 700/177 |
| 2010/0005936 A1* | 1/2010 | Yoshino | ............. | B23B 1/00 29/27 R |
| 2010/0010662 A1* | 1/2010 | Inagaki | ............. | B23Q 17/0976 700/175 |
| 2010/0104388 A1* | 4/2010 | Suzuki | ............. | B23Q 11/0039 409/131 |
| 2011/0251714 A1* | 10/2011 | Nishikawa | ............. | B23Q 17/20 700/174 |
| 2012/0010744 A1* | 1/2012 | Yamashita | ............. | B23Q 15/12 700/173 |
| 2012/0093598 A1* | 4/2012 | Ando | ............. | B23Q 17/007 408/16 |
| 2012/0093603 A1* | 4/2012 | Ueno | ............. | G05B 19/404 409/79 |
| 2012/0101624 A1* | 4/2012 | Ueno | ............. | B23Q 17/0976 700/173 |
| 2012/0136474 A1* | 5/2012 | Miyamoto | ............. | B23Q 17/0976 700/173 |
| 2013/0309034 A1* | 11/2013 | Inagaki | ............. | B23Q 17/0976 409/132 |
| 2013/0345851 A1* | 12/2013 | Kataoka | ............. | G05B 19/404 700/174 |
| 2014/0121817 A1* | 5/2014 | Nishimura | ............. | G05B 19/182 700/160 |
| 2015/0306720 A1* | 10/2015 | Ono | ............. | B23Q 15/12 700/174 |

OTHER PUBLICATIONS

European Search Report for related European Application No. 15168448.7; report dated Dec. 11, 2015.

* cited by examiner

METHOD OF CALCULATING A STABLE SPINDLE ROTATION NUMBER AND AN APPARATUS FOR CALCULATING A STABLE SPINDLE ROTATION NUMBER

BACKGROUND

Field of the Disclosure

The present disclosure relates to a method of calculating a spindle rotation number capable of suppressing regenerative chatter vibration in cutting using a machine tool, a method of informing the spindle rotation number, a spindle rotation number controlling method, and an NC program editing method, and apparatus for performing these methods.

Background of the Disclosure

It has conventionally been well known that machining accuracy (in particular, surface accuracy) deteriorates due to chatter vibration when machining a workpiece using a machine tool. Such chatter vibration is roughly classified into forced chatter vibration and self-excited chatter vibration, and it has been considered that forced chatter vibration occurs when an excessive external force is applied or when a frequency of an external force is synchronized with a resonant frequency of a vibrating system. On the other hand, self-excited chatter vibration includes regeneration type chatter vibration (regenerative chatter vibration) and mode-coupling type chatter vibration, and it has been considered that regenerative chatter vibration is caused by continuing cutting in which periodic variation of cutting resistance and periodic variation of thickness of cut are increased by interaction between them (the so-called "regeneration effect") and it has been considered that mode-coupling type chatter vibration is caused by the fact that vibration modes in two directions are coupled together when their resonant frequencies are close to each other.

Further, conventionally, as a method of suppressing regenerative chatter vibration, which is one of the above-mentioned various type of chatter vibration, there has been proposed a method in which a stability limit diagram (diagram showing a stability limit in width of cut with respect to spindle rotation number; width of cut=depth of cut) as shown in FIG. 4(a) is obtained and a spindle rotation number is adjusted so that it is positioned in a stable area. Further, a machining data correction method that is an improvement of the method is disclosed in Japanese Unexamined Patent Application Publication No. 2013-43240.

As shown in FIG. 4(a), in the stability limit diagram, there are a plurality of areas called stable pockets (for example, a "stable pocket 1", a "stable pocket 2", and a "stable pocket 3") where no regenerative chatter vibration occurs even if the depth of cut is large, and spindle rotation numbers around the stable pockets are regarded as stable spindle rotation numbers. Further, when a natural frequency of a tool is represented by $f_r$ [Hz] and the number of teeth of the tool is represented by N, a spindle rotation number $n_1$ [min$^{-1}$] at the "stable pocket 1", which is the largest spindle rotation number, is represented as $n_1=f_r\times 60/N$, a spindle rotation number $n_2$ at the "stable pocket 2" is represented as $n_2=f_r\times 60/(N\times 2)$, and a spindle rotation number $n_3$ at the "stable pocket 3" is represented as $n_3=f_r\times 60/(N\times 3)$. Thus, a spindle rotation number $n_m$ at a "stable pocket m" which is the m$^{th}$ stable pocket is represented as $n_m=f_r\times 60/(N\times m)$ (m is a positive integer). Further, the higher the spindle rotation number is, the wider the stable area of the stable pocket is.

A basic method of obtaining the stability limit diagram is explained in detail in Eiji Shamoto, "Mechanism and Suppression of Chatter Vibrations in Cutting", Electric Furnace Steel, Vol. 82 No. 2, 2011, and Norikazu Suzuki, "Chatter Vibration in Cutting, Part 1", Journal of the Japan Society for Precision Engineering, Vol. 76, No. 3, 2010. According to the Shamoto and Suzuki publications, a stability limit in depth of cut $a_{lim}$ is calculated by the following equation.

$$a_{lim}=-1/(2K_f\times G(\omega_c))$$

It is noted that, in the equation, $K_f$ is a specific cutting resistance [N/mm$^2$], $G(\omega_c)$ is a real part of a compliance transfer function (ratio of vibration displacement output to force input) of a machine structure, and $\omega_c$ is an angular frequency.

Further, the specific cutting resistance $K_f$ is a force in a cutting direction when cutting a workpiece so that a chip with the thickness of 1 mm and the cross-sectional area of 1 mm$^2$ is produced. For example, as disclosed in Japanese Unexamined Patent Application Publication No. 2013-43240, the specific cutting resistance $K_f$ can be calculated from a value of current flowing through a spindle motor when performing a test cutting on an appropriate workpiece using a tool to be used.

Further, the real part $G(\omega_c)$ of the compliance transfer function is obtained by attaching a vibration detector (acceleration sensor) to a tip end of a tool attached to a spindle of a machine tool and then striking the tip end portion of the tool with an impact hammer having a force sensor (load cell) attached to its striking portion, and processing the resultant output signal of the acceleration sensor (signal relating to free vibration of the tool) and output signal of the force sensor (signal relating to the striking force) using a dedicated processor, which is summarized and disclosed also in Japanese Unexamined Patent Application Publication No. 2013-43240.

SUMMARY OF THE DISCLOSURE

As described above, however, in the conventional method for suppressing regenerative chatter vibration, it is necessary to perform previous operations for obtaining a stability limit diagram, such as a test machining for obtaining a specific cutting resistance $K_f$ and a striking test using an impact hammer for obtaining a real part $G(\omega_c)$ of a compliance transfer function, and further, because the specific cutting resistance $K_f$ and the real part $G(\omega_c)$ of the compliance transfer function are values specific to a tool and a machine tool, it is necessary to perform the above-mentioned previous operations corresponding to a tool and a machine tool to be used; therefore, there is a problem that the operations are troublesome and very annoying.

Further, artificial variation easily occurs in the striking test using an impact hammer because the striking test is performed by a human, and there is also a technical problem that technical skills are required in striking itself in order to obtain appropriate data.

Furthermore, as for a hammer tip to be attached to the striking portion of the impact hammer, it is necessary to calculate a period of a vibration frequency to be measured (a reciprocal of the frequency) and select a hammer tip by trial and error so that the time of contact of the hammer is within a range of about 0.3 to one times the period; therefore, the conventional method is troublesome also in this respect.

In view of the above-described circumstances, the present disclosure provides a method capable of determining a stable spindle rotation number that is capable of suppressing regenerative chatter vibration without performing troublesome previous operation calculations, an apparatus therefor, and so on.

The present disclosure, for solving the above-mentioned problems, relates to a method of calculating a stable spindle rotation number capable of suppressing regenerative chatter vibration in cutting using a machine tool, including:

a vibration frequency calculating step of calculating a vibration frequency of a tool by obtaining data on vibration caused by the tool in cutting and analyzing the obtained vibration data;

a regenerative chatter detecting step of detecting whether regenerative chatter vibration occurs in the tool by comparing the vibration frequency of the tool calculated in the vibration frequency calculating process with a spindle rotation number;

a rotation number changing step of gradually decreasing or increasing the spindle rotation number in a case where occurrence of regenerative chatter vibration is detected in the regenerative chatter detecting process; and a stable rotation number calculating step of monitoring variation of the vibration frequency of the tool calculated in the vibration frequency calculating process and determining a spindle rotation number when the variation of the vibration frequency exceeds a predetermined reference value to be a stable spindle rotation number.

Further, this method is suitably performed by a stable spindle rotation number calculating apparatus having a configuration described below. That is, the stable spindle rotation number calculating apparatus is configured to include:

a vibration data obtainer that obtains data on vibration caused by a tool in cutting;

a vibration frequency calculator that calculates a vibration frequency of the tool by analyzing the vibration data obtained by the vibration data obtainer;

a regenerative chatter detector that detects whether regenerative chatter vibration occurs in the tool by comparing the vibration frequency of the tool calculated by the vibration frequency calculator with a spindle rotation number;

a spindle rotation controller that gradually decreases or increases the spindle rotation number in a case where occurrence of regenerative chatter vibration is detected by the regenerative chatter detector; and a stable rotation number calculator that monitors variation of the vibration frequency of the tool calculated by the vibration frequency calculator and determines a spindle rotation number when the variation of the vibration frequency exceeds a predetermined reference value to be a stable spindle rotation number.

According to this calculating apparatus, first, data on vibration caused by a tool in cutting is obtained by the vibration data obtainer and the obtained vibration data is analyzed by the vibration frequency calculator to calculate a vibration frequency of the tool, and the calculated vibration frequency is transmitted to the regenerative chatter detector (vibration frequency calculation step).

The regenerative chatter detector compares the vibration frequency of the tool calculated by the vibration frequency calculator with the then spindle rotation number and, when the vibration frequency of the tool is different from a frequency corresponding to the product of the spindle rotation number and the number of teeth of the tool, determines that regenerative chatter vibration occurs in the tool (regenerative chatter detection step). It is noted that the obtaining of vibration data, the calculation of vibration frequency and the detection of regenerative chatter are continuously executed at predetermined time intervals during cutting.

Further, once occurrence of regenerative chatter vibration is detected by the regenerative chatter detector, the spindle rotation controller gradually decreases or increases the spindle rotation number (rotation number change step) and the stable rotation number calculator monitors variation of the vibration frequency of the tool calculated by the vibration frequency calculator and, when the variation of the vibration frequency exceeds a predetermined reference value, determines the then spindle rotation number to be a stable spindle rotation number (stable rotation number calculation step). It is noted that the variation of the vibration frequency can be grasped by calculating differences between the vibration frequencies transmitted successively from the vibration frequency calculator.

FIG. 4(b) is a diagram showing a relationship between spindle rotation number and frequency of regenerative chatter vibration, where a curve indicating the frequency of regenerative chatter vibration corresponding to the spindle rotation number is divided at several spindle rotation numbers and manners of variation of the divided curves are different from each other. That is, when regenerative chatter vibration occurs, if the variation of the vibration frequency of the tool calculated by the vibration frequency calculator is monitored while, for example, the spindle rotation number is gradually decreased, at a certain point, the vibration frequency suddenly increases, that is, the variation of the vibration frequency becomes extremely large, in other words, exceeds a predetermined reference value. For example, in FIG. 4(b), if the spindle rotation number is gradually decreased from 5000 [min$^{-1}$], the vibration frequency gradually decreases along the curve A and sharply increases from about 147 [Hz] to about 177 [Hz] around the spindle rotation number of 4600 [min$^{-1}$], and then gradually decreases along the curve B.

As understood by referring to FIGS. 4(a) and 4(b), the spindle rotation number at which the variation exceeds the predetermined reference value is a rotation number that corresponds to a stable pocket, and the spindle rotation number at which the variation of the vibration frequency exceeds the predetermined reference value can be determined to be a stable spindle rotation number. It is noted that the spindle rotation number at which the variation of the vibration frequency exceeds the predetermined reference value can be checked also by gradually increasing the spindle rotation number. Therefore, in the present disclosure, in the case where occurrence of regenerative chatter vibration is detected by the regenerative chatter detector, the spindle rotation number is gradually decreased or increased by the spindle rotation controller. Further, the predetermined reference value is for detecting a singular point of the variation of the vibration frequency and is previously determined as appropriate to allow the singular point to be detected.

Thus, according to the present disclosure, a stable spindle rotation number can be determined by monitoring whether regenerative chatter vibration occurs during cutting and, when regenerative chatter vibration occurs, gradually decreasing or increasing the spindle rotation number and monitoring variation of the vibration frequency of the tool; therefore, a stable spindle rotation number can be obtained automatically and precisely without requiring a troublesome and unstable previous operation which has conventionally been required.

Further, in the present disclosure, in the stable rotation number calculation step executed by the stable rotation number calculator, a stable rotation number $n_i$ may be calculated by using Equations 1 and 2 below.

$$i_b = (f \times 60)/(n \times N);$$ (Equation 1)

$$n_i = (f \times 60)/(N \times i),$$ (Equation 2)

where f [Hz] is a vibration frequency immediately before the variation of the vibration frequency exceeds the predetermined reference value in the case where the spindle rotation controller gradually decreases the spindle rotation number, or a vibration frequency immediately after the variation of the vibration frequency exceeds the predetermined reference value in the case where the spindle rotation controller gradually increases the spindle rotation number, n [min$^{-1}$] is a spindle rotation number when the variation of the vibration frequency exceeds the predetermined reference value, N is the number of teeth of the tool, and $i_b$ is a positive integer. The integer $i_b$ is first approximately calculated by Equation 1 and then a stable rotation number $n_i$ is calculated by Equation 2 based on a positive integer i equal to or smaller than the calculated integer $i_b$.

As seen from FIG. 4(b), the vibration frequency f is a value close to a resonant frequency of the tool (the natural frequency $f_r$). Therefore, ((f×60)/N) represents a spindle rotation number at the stable pocket 1 and the integer $i_b$ obtained by dividing ((f×60)/N) by the then spindle rotation number is an index indicating the ordinal number of the stable pocket to which the spindle rotation number n corresponds. If $i_b$ is approximate to the integer "4", the spindle rotation number n is regarded as a spindle rotation number corresponding to the stable pocket 4. Then, a spindle rotation number $n_3$ that is obtained by substituting "3", which is an integer smaller than "4", for i in Equation 2 is a spindle rotation number corresponding to the "stable pocket 3", a spindle rotation number $n_2$ that is obtained by substituting "2" for i is a spindle rotation number corresponding to the "stable pocket 2", and a spindle rotation number $n_1$ that is obtained by substituting "1" for i is a spindle rotation number corresponding to the "stable pocket 1". Thus, a stable spindle rotation number $n_i$ can be calculated by using Equations 1 and 2 above.

Further, in the present disclosure, an informer may be further provided for informing the operator of the stable rotation number calculated by the stable rotation number calculator (informing step). When thus configured, in a case where regenerative chatter vibration occurs, the operator can easily obtain and recognize a stable spindle rotation number capable of eliminating the regenerative chatter vibration. It is noted that the stable rotation number may be informed by displaying it on a display or may be informed by outputting it by voice through a speaker.

Further, in the present disclosure, the spindle rotation controller may be configured to further correct the spindle rotation number for cutting to the stable rotation number calculated by the stable rotation number calculator (rotation number correction step). In this configuration, even if regenerative chatter vibration occurs during cutting, the regenerative chatter vibration can be automatically eliminated without requiring the operator to take any action; therefore, stable machining is achieved. Further, it is possible to prevent a workpiece from becoming a defective product due to regenerative chatter vibration.

Further, in the present disclosure, the spindle rotation controller may be configured to, in a case where a plurality of stable rotation numbers are calculated, in the rotation number correction step, sequentially correct the spindle rotation number for cutting in order starting with the smallest one of the calculated stable rotation numbers while referring to the detection results in the regenerative chatter detection step. In this configuration, it is possible to eliminate regenerative chatter vibration without lowering machining efficiency.

Further, in the present disclosure, an NC program editor may be further provided for correcting a spindle rotation number set in an NC program to the stable rotation number calculated by the stable rotation number calculator (NC program correction step). According to this configuration, in a case where a spindle rotation number set in an NC program is a rotation number that causes regenerative chatter vibration, the spindle rotation number is automatically corrected to a stable rotation number by the NC program editor; therefore, an appropriate NC program that does not cause regenerative chatter vibration can be automatically obtained without bothering the operator and the NC program is prevented from remaining uncorrected. Therefore, when machining is performed using the NC program thereafter, the machining is certainly stable.

It is noted that, in the case where a plurality of stable rotation numbers are calculated by the stable rotation number calculator in the stable rotation number calculation step, the NC program editor may, in the NC program correction step, correct the spindle rotation number set in the NC program to the largest stable rotation number or freely select one of the calculated stable rotation numbers and correct the spindle rotation number set in the NC program to the selected stable rotation number.

As described above, according to the present disclosure, a stable spindle rotation number can be determined by monitoring whether regenerative chatter vibration occurs during cutting and, when regenerative chatter vibration occurs, gradually decreasing or increasing the spindle rotation number and monitoring variation of the vibration frequency of the tool; therefore, a stable spindle rotation number can be obtained automatically and precisely without requiring a troublesome and unstable previous operation which has conventionally been required.

Additionally, if an informer provided for informing an operator of a stable rotation number, when regenerative chatter vibration occurs, the operator can easily obtain and recognize a stable spindle rotation number capable of eliminating the regenerative chatter vibration.

Further, if the spindle rotation controller is configured to correct the spindle rotation number for cutting to a stable rotation number calculated by the stable rotation number calculator, even if regenerative chatter vibration occurs during cutting, the regenerative chatter vibration can be automatically eliminated without requiring the operator to take any action; therefore, stable machining is achieved.

Further, if an NC program editor is provided for correcting a spindle rotation number set in an NC program to a stable rotation number calculated by the stable rotation number calculator, in a case where a spindle rotation number set in an NC program is a rotation number that causes regenerative chatter vibration, the spindle rotation number is automatically corrected to a stable rotation number; therefore, an appropriate NC program that does not cause regenerative chatter vibration can be automatically obtained without bothering the operator.

BRIEF DESCRIPTION OF THE DRAWINGS

For a more complete understanding of the disclosed methods and apparatus, reference should be made to the embodiment illustrated in greater detail on the accompanying drawings, wherein.

DETAILED DESCRIPTION

Specific embodiments of the present disclosure will be described below with reference to the drawings.

Figure 1:
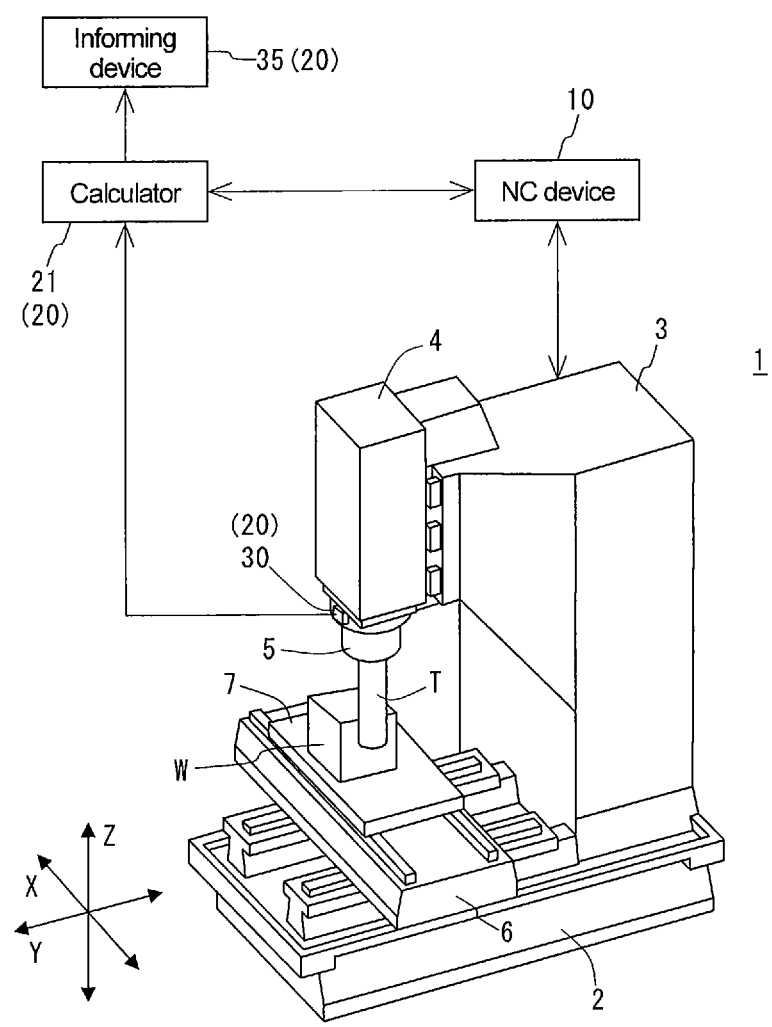
FIG. 1 is an explanatory diagram showing a schematic configuration of an NC machine tool and a spindle rotation number controller according to a first embodiment of the present disclosure.
Figure 2:
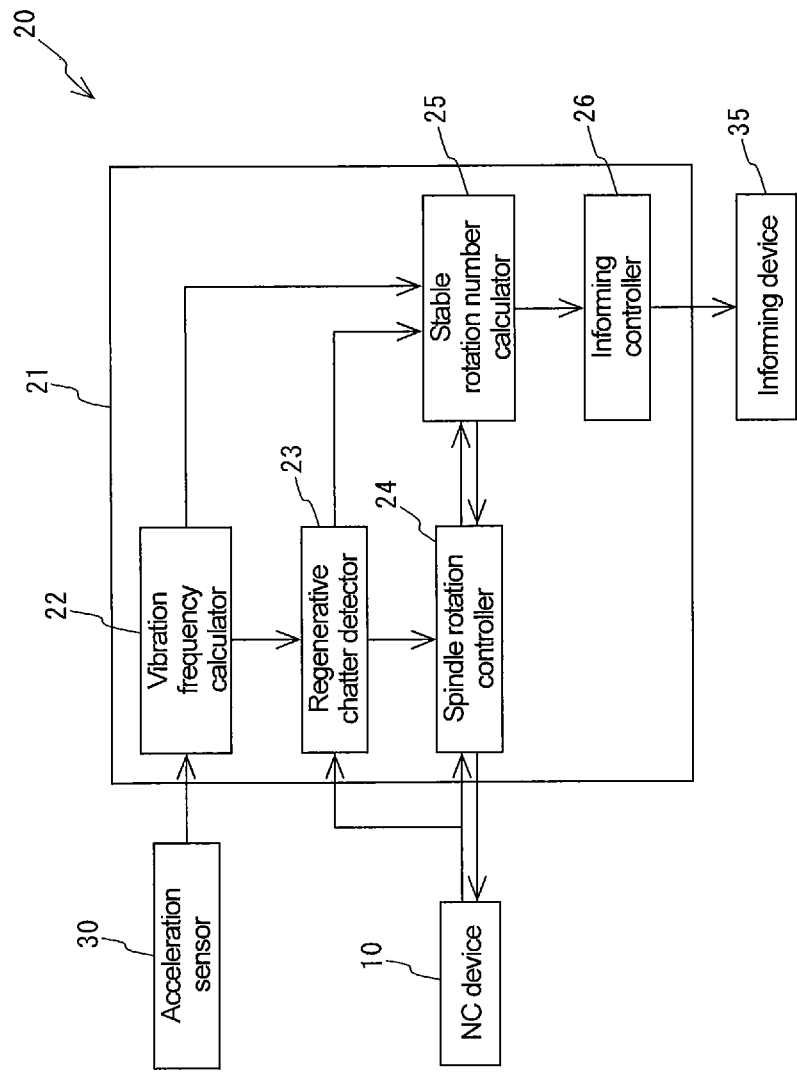
FIG. 2 is a block diagram showing a schematic configuration of the spindle rotation number controller according to the first embodiment of the present disclosure.

FIG. 1 is an explanatory diagram showing a schematic configuration of a spindle rotation number controller and an NC machine tool to which the spindle rotation number controller is attached according to a first embodiment, and FIG. 2 is a block diagram showing a configuration of the spindle rotation number controller.

First, a summary of the NC machine tool 1 is described. This NC machine tool 1 includes a bed 2, a column 3 erected on the bed 2, a spindle head 4 provided on a front surface (machining-area-side surface) of the column 3 to be movable in the Z-axis direction indicated by an arrow, a spindle 5 held by the spindle head 4 to be rotatable about its axis, a saddle 6 provided on the bed 2 below the spindle head 4 to be movable in the Y-axis direction indicated by an arrow, a table 7 arranged on the saddle 6 to be movable in the X-axis direction indicated by an arrow, a feed mechanism (not shown) moving the spindle head 4, the saddle 6 and the table 7 in their respective axis directions, a spindle motor (not shown) rotating the spindle 5, and an NC device 10 numerically controlling the feed mechanism (not shown), the spindle motor (not shown) and so on. It is noted that the X axis, the Y axis, and the Z axis are orthogonal to one another.

Thus, in this NC machine tool 1, the feed mechanism (not shown) and the spindle motor (not shown) are driven under control by the NC device 10, and thereby the spindle 5 is rotated about its axis and the spindle 5 and the table 7 are relatively moved in a three-dimensional space. Further, for example, when the NC device 10 drives the feed mechanism (not shown) and the spindle motor (not shown) in accordance with an internally stored NC program, for example, a workpiece W placed and fixed on the table 7 is machined as appropriate by a tool T attached to the spindle 5.

Next, the spindle rotation number controller 20 of the present embodiment is described. As shown in FIGS. 1 and 2, the spindle rotation number controller 20 of the present embodiment consists of a calculator 21, an acceleration sensor 30 installed on an outer peripheral surface of the spindle 5, and an informing device 35 connected to the calculator 21.

The acceleration sensor 30 detects acceleration of the spindle 5, in other words, acceleration (i.e. vibration) transmitted from the tool T attached to the spindle 5. When cutting the workpiece W using the rotating tool T, vibration occurs in the tool T due to cutting resistance in the cutting; the acceleration sensor 30 detects vibration transmitted to the spindle 5 from the tool T (vibration caused by the tool T) and outputs a signal corresponding to the vibration.

The informing device 35 is composed of a display for displaying a screen and displays a screen relating to a stable rotation number.

The calculator 2l consists of hardware such as CPU, ROM, and RAM, software stored in an appropriate memory such as ROM and RAM, and so on. When the software is executed, the calculator 21 functions as various functional units: a vibration frequency calculator 22, a regenerative chatter detector 23, a stable rotation number calculator 25, a spindle rotation controller 24, and an informing controller 26.

During cutting of the workpiece W using the tool T, the vibration frequency calculator 22 inputs an output signal from the acceleration sensor 30 and performs the Fourier analysis thereon, and determines the most numerous frequency component to be a vibration frequency of the tool T and transmits it to the regenerative chatter detector 23 and the stable rotation number calculator 25. It is noted that this vibration frequency calculation process is continuously performed at predetermined sampling intervals during cutting.

The regenerative chatter detector 23 receives the vibration frequency of the tool T calculated by the vibration frequency calculator 22 from the vibration frequency calculator 22 and receives the then rotation number of the spindle 5 from the NC device 10, and compares the vibration frequency of the tool T with the rotation number of the spindle 5 (hereinafter, referred to as "the spindle rotation number"), thereby determining whether regenerative chatter vibration occurs in the tool T. More specifically, the regenerative chatter detector 23 compares the vibration frequency of the tool T with a frequency band (spindle rotation frequency band) obtained by adding a predetermined margin to a frequency corresponding to the product of multiplication of the spindle rotation number and the number of teeth of the tool T (spindle rotation frequency); when the vibration frequency of the tool T is out of the spindle rotation frequency band, the regenerative chatter detector 23 determines that regenerative chatter vibration occurs in the tool T, and transmits a regenerative chatter detection signal to the spindle rotation controller 24 and the stable rotation number calculator 25. The frequency obtained by multiplying the spindle rotation number by the number of teeth of the tool T is a vibration frequency caused by contact of the teeth of the tool T with the workpiece W, and therefore it is a normal vibration frequency. On the other hand, other vibration frequencies can be regarded as abnormal vibration frequencies, that is, vibration frequencies related to regenerative chatter vibration.

When receiving the regenerative chatter vibration signal from the regenerative chatter detector 23, the spindle rotation controller 24 transmits to the NC device 10 a signal for gradually decreasing the spindle rotation number. Although the signal for gradually decreasing the spindle rotation number may be a special signal, it is preferred that the signal is an override signal for adjusting the spindle rotation number that follows a present command. Because a typical NC device 10 has an override function, if the spindle rotation number is decreased using this override function, it is not necessary to improve the NC device 10 and it is possible to prevent increase of the device cost. It is noted that, in the case of decreasing the spindle rotation number by the override signal, the spindle rotation controller 24 transmits gradually decreased override values (percentages), such as 99%, 98%, and 97%, to the NC device 10 at predetermined time intervals. Thereby, the spindle rotation number is gradually decreased under control by the NC device 10.

Further, when receiving data relating to a stable rotation number $n_i$ calculated by the stable rotation number calculator 25, which will be described in detail later, the spindle rotation controller 24 cancels the above-described process of gradually decreasing the spindle rotation number, and transmits a correction signal to the NC device 10 in order to correct the spindle rotation number during cutting to the received stable rotation number $n_i$, thereby correcting the rotation number of the spindle 5. It is noted that the correction signal may be a special signal containing data relating to a correction rotation number; however, similarly to the above, it is preferred that it is an override signal for adjusting the spindle rotation number set in an NC program to the correction rotation number. In this configuration, it is not necessary to improve the NC device 10 and it is possible to prevent increase of the device cost. Further, in a case where the spindle rotation controller receives data relating to a plurality of stable rotation numbers $n_i$, the spindle rotation number is corrected so that it becomes the largest one of the stable rotation numbers.

The stable rotation number calculator 25 starts to operate after receiving the regenerative chatter detection signal from the regenerative chatter detector 23. The spindle rotation number calculator 25 monitors variation of the vibration frequency of the tool T transmitted from the vibration frequency calculator 22, and when the variation of the vibration frequency exceeds a predetermined reference value, the stable rotation number calculator 25 calculates a stable rotation number $n_i$ [min$^{-1}$] as a candidate in accordance with Equations 1 and 2 below based on a frequency f [Hz] immediately before the variation of the vibration frequency exceeds the reference value and the then spindle rotation number n [min$^{-1}$], and transmits data relating to the calculated stable rotation number $n_i$ to the spindle rotation controller 24 and the informing controller 26. It is noted that the variation of the vibration frequency can be calculated by calculating the differences between the vibration frequencies successively transmitted from the vibration frequency calculator 22. Further, the spindle rotation number n is received from the NC device 10 through the spindle rotation controller 24.

$$i_b = (f \times 60)/(n \times N);$$ (Equation 1)

and $$n_i = (f \times 60)/(N \times i),$$ (Equation 2)

where N is the number of teeth of the tool T, $i_b$ is a positive integer, and i is a positive integer equal to or smaller than $i_b$.

Figure 4:
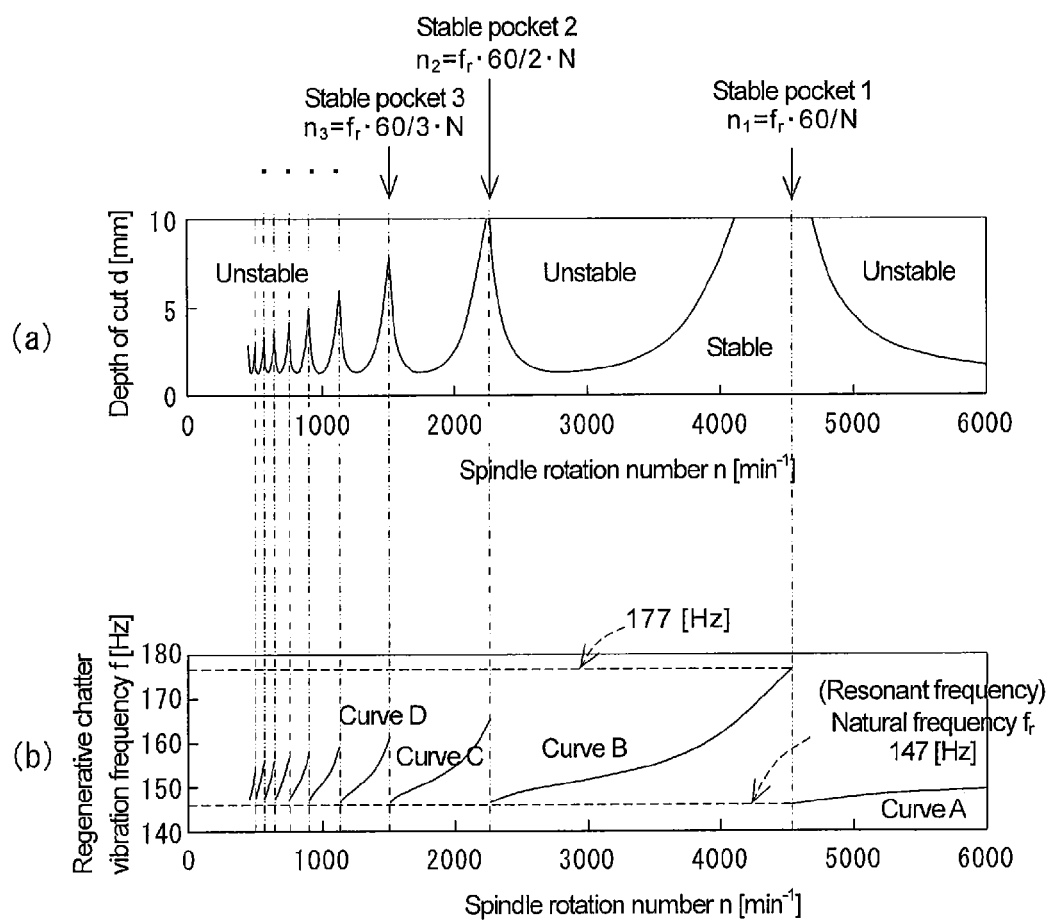
FIG. 4 shows explanatory diagrams for explaining a stable spindle rotation number; (a) is a stability limit diagram showing a stability limit in width of cut with respect to spindle rotation number and (b) is a diagram showing a relationship between spindle rotation number and frequency of regenerative chatter vibration.

As has been described using FIG. 4, the correspondence curve between spindle rotation number n and frequency of regenerative chatter vibration is divided at several spindle rotation numbers n as shown in FIG. 4(b), and manners of variation of the divided curves are different from each other. That is, when regenerative chatter vibration occurs, if the variation of the vibration frequency of the tool T is monitored is monitored while, for example, the spindle rotation number is gradually decreased, at a certain point, the vibration frequency suddenly increases, that is, the variation of the vibration frequency becomes extremely large and exceeds a predetermined reference value.

For example, in FIG. 4(b), if the spindle rotation number n is gradually decreased from 5000 [min$^{-1}$], the vibration frequency gradually decreases along the curve A and sharply increases from about 147 [Hz] to about 177 [Hz] around the spindle rotation number of 4600 [min$^{-1}$], and then gradually decreases along the curve B. As understood by referring to FIGS. 4(a) and 4(b), the spindle rotation number at which the variation of the vibration frequency exceeds the predetermined reference value is a rotation number that corresponds to a stable pocket, and the spindle rotation number at which the variation of the vibration frequency exceeds the predetermined reference value is a stable rotation number. It is noted that the predetermined reference value is for detecting a singular point of the variation of the vibration frequency and is previously determined as appropriate to allow the singular point to be detected.

Further, as seen from FIG. 4(b), the vibration frequency f immediately before the variation exceeds the predetermined reference value is a value close to a resonant frequency (natural frequency $f_r$) of the tool T. Therefore, $((f \times 60)/N)$ in Equation 1 above can be regarded as $((f_r \times 60)/N)$ and corresponds to a spindle rotation number at the stable pocket 1. Therefore, the integer $i_b$ approximately calculated by dividing $((f \times 60)/N)$ by the then spindle rotation number n is an index indicating the ordinal number of the stable pocket to which the spindle rotation number n corresponds.

For example, if occurrence of regenerative chatter vibration is detected by the regenerative chatter detector 23 when the spindle rotation number n is 1400 [min$^{-1}$], and the stable rotation number calculator 25 receives a generative chatter detection signal from the regenerative chatter detector 23, the stable rotation number calculator 25 monitors variation of the vibration frequency of the tool T transmitted from the vibration frequency calculator 22 (variation indicated by the curve D). If the variation of the vibration frequency exceeds the predetermined reference value around the point where the spindle rotation number n becomes 1125 [min$^{-1}$], the stable rotation number calculator 25 detects that the variation of the vibration frequency has exceeded the predetermined reference value, and calculates the integer $i_b$ as the stable pocket index as described below in accordance which Equation 1 above, based on the vibration frequency f immediately before the variation of the vibration frequency exceeded the predetermined reference value, i.e. 147 [Hz], and the then spindle rotation number n, i.e. 1125 [min$^{-1}$]. It is noted that the number of teeth N of the tool T is 2.

$$i_b = 147 \times 60/(1125 \times 2) = 3.92 \approx 4$$

Based on this result, 1125 [min-1] can be regarded as a stable rotation number at the 4th stable pocket.

Subsequently, the stable rotation number calculator 25 determines positive integers equal to or lower than the calculated $i_b$ (=4), and substitutes them for i in Equation 2 above to calculate stable rotation numbers $n_i$ [min$^{-1}$] as candidates. In this example, the stable rotation number $n_4$ corresponding to the 4th stable pocket is $$n_4 = (147 \times 60)/(2 \times 4) = 1103 \text{ [min-1]},$$

the stable rotation number n3 corresponding to the third stable pocket is $$n_3 = (147 \times 60)/(2 \times 3) = 1470 \text{ [min-1]},$$

the stable rotation number n2 corresponding to the second stable pocket is $$n_2 = (147 \times 60)/(2 \times 2) = 2205 \text{ [min-1]}, \text{ and}$$

the stable rotation number n1 corresponding to the first stable pocket is $$n_1 = (147 \times 60)/(2 \times 1) = 4410 \text{ [min-1]}.$$

The stable rotation number calculator 25 calculates stable spindle rotation numbers $n_i$ as candidates in this matter and transmits data relating to the calculated stable rotation numbers $n_i$ to the spindle rotation controller 24 and the informing controller 26. It is noted that the integer $i_b$ can become 1 depending on the spindle rotation number n when regenerative chatter vibration occurs, and in this case, only the stable rotation number $n_1$ corresponding to the "stable pocket 1" is calculated.

The informing controller 26 is a functional unit that controls for screen display on the informing device 35, and displays a screen showing information relating to the stable rotation number $n_i$ calculated by the stable rotation number calculator 25 on the informing device 35. As for the screen displayed, a text screen showing the stable rotation number $n_i$ can be given as an example.

According to the spindle rotation number controller 20 of the present embodiment having the above-described configuration, vibration caused by the tool T is detected by the acceleration sensor 30 and a signal corresponding to the vibration is input to the vibration frequency calculator 22. Then, the vibration frequency calculator 22 performs the Fourier analysis on the vibration signal input from the acceleration sensor 30 at least during cutting, determines the most numerous frequency component to be a vibration frequency of the tool T, and transmits the vibration frequency of the tool T to the regenerative chatter detector 23 and the stable rotation number calculator 25.

The regenerative chatter detector 23 compares the vibration frequency of the tool T calculated by the vibration frequency calculator 22 with the then rotation number of the spindle 5 and determines whether regenerative chatter vibration occurs in the tool T. In the case where it is determined that regenerative chatter vibration occurs, the regenerative chatter detector 23 transmits a regenerative chatter detection signal to the spindle rotation controller 24 and the stable rotation number calculator 25.

Upon receipt of the generative chatter detection signal from the regenerative chatter detector 23, the spindle rotation controller 24 transmits to the NC device 10 a signal for gradually decreasing the spindle rotation number to gradually decrease the spindle rotation number.

On the other hand, simultaneously with the process of decreasing the spindle rotation number by the spindle rotation controller 24, the stable rotation number calculator 25 monitors variation of the vibration frequency of the tool T transmitted from the vibration frequency calculator 22, and when the variation of the vibration frequency exceeds a predetermined reference value, the stable rotation number calculator 25 calculates a stable rotation number $n_i$ [min$^{-1}$] as a candidate in accordance with Equations 1 and 2 above based on a vibration frequency f [Hz] immediately before the vibration frequency exceeded a predetermined reference value and the then spindle rotation number n [min$^{-1}$], and transmits data relating to the calculated stable rotation number $n_i$ to the spindle rotation controller 24 and the informing controller 26.

Upon receipt of the data relating to the stable rotation number $n_i$ from the stable rotation number calculator 25, the spindle rotation controller 24 cancels the process of gradually decreasing the spindle rotation number and transmits a correction signal to the NC device 10 to correct the rotation number of the spindle 5 to the stable rotation number $n_i$.

Further, the informing controller 26 displays a screen showing information relating to the stable rotation number $n_i$ received from the stable rotation number calculator 25 on the informing device 35.

Thus, according to the spindle rotation number controller 20 of the present embodiment, a stable spindle rotation number $n_i$ can be determined by causing the regenerative chatter detector 23 to monitor whether regenerative chatter vibration occurs during cutting, and when regenerative chatter vibration occurs, causing the spindle rotation controller 24 to gradually decrease the spindle rotation number and the stable rotation number calculator 25 to monitor variation of a vibration frequency of the tool T; therefore, a stable spindle rotation number $n_i$ can be obtained automatically and precisely without requiring a troublesome and unstable previous operation which has conventionally been required.

Further, when regenerative chatter vibration occurs during cutting, the regenerative chatter vibration can be automatically eliminated without requiring an operator to take any action since the spindle rotation number during the cutting is automatically corrected to the stable spindle rotation number $n_i$ by the spindle rotation controller 24; therefore, stable machining is achieved. Further, this process enables a workpiece to be prevented from becoming a defective product due to regenerative chatter vibration.

Further, since the stable rotation number $n_i$ calculated by the stable rotation number calculator 25 is displayed on the informing device 35, when regenerative chatter vibration occurs, the operator can easily recognize the stable spindle rotation number that is capable of eliminating the regenerative chatter vibration, and therefore can take actions such as changing a corresponding spindle rotation number provided in an NC program stored in the NC device 10 to the displayed stable rotation number $n_i$.

Further, the spindle rotation controller 24 is configured to, in the case where a plurality of stable rotation numbers $n_i$ are calculated by the stable rotation number calculator 25, correct the spindle rotation number during cutting to the largest stable rotation number $n_i$; therefore, it is possible to eliminate the regenerative chatter vibration without lowering machining efficiency.

Next, an NC program editing apparatus according to a second embodiment of the present disclosure will be described with reference to FIG. 3.

Figure 3:
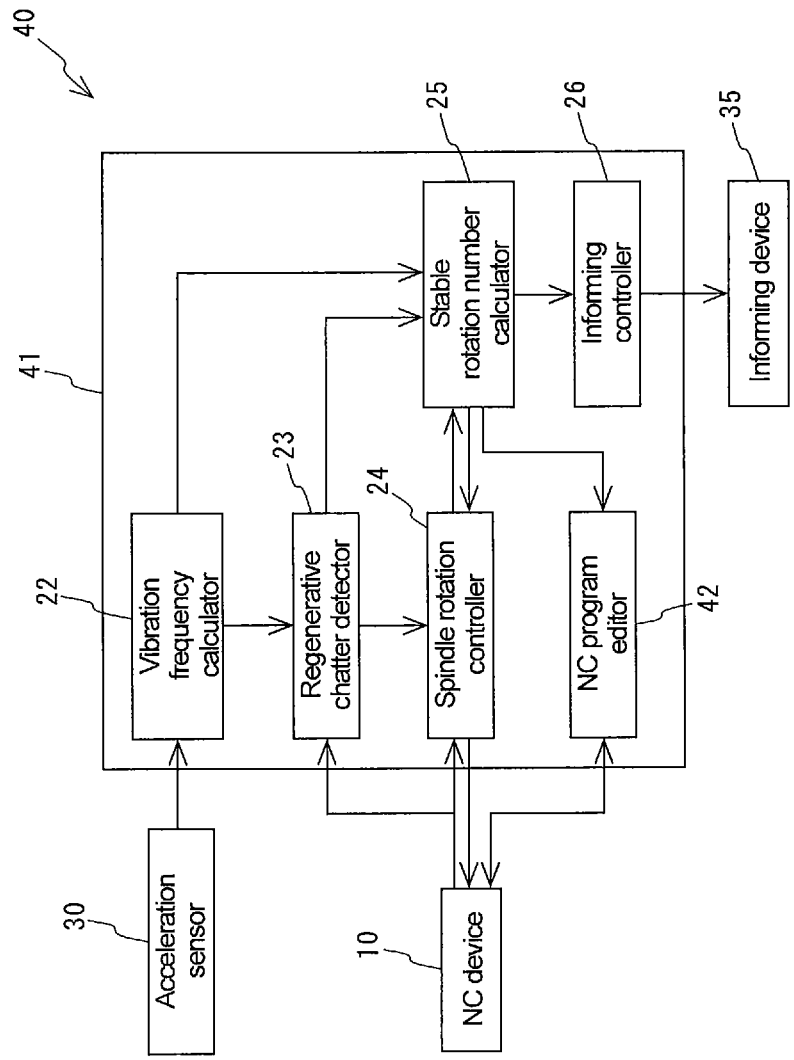
FIG. 3 is a block diagram showing a schematic configuration of an NC program editing apparatus according to a second embodiment of the present disclosure.

It is noted that the NC program editing apparatus 40 of the present embodiment is an apparatus obtained by embodying it as an NC program editing apparatus, and, as shown in FIG. 3, the configuration of a calculator 41 of the NC program editing apparatus 40 is different from that of the calculator 21 of the above-described spindle rotation number controller 20 only in that it has an NC program editor 42. Except for this, the NC program editing apparatus 40 has the same configuration as that of the above-described spindle rotation number controller 20. Therefore, the same components are denoted by the same reference numerals and detail explanation thereof is omitted.

The NC program editor 42 is connected to the NC device 10. Upon receipt of data relating to the stable rotation number $n_i$ from the stable rotation number calculator 25, the NC program editor 42 changes the corresponding spindle rotation number in the NC program stored in the NC device 10 to the transmitted stable rotation number $n_i$ after the cutting operation being executed is finished.

As a specific mode of this changing process, for example, a corresponding NC program is read out from the NC device 10 and a corresponding S code in the NC program is detected, a numeral value for the spindle rotation number in the S code is replaced with a numeral value for the stable spindle rotation number $n_i$, and then the corresponding NC program stored in the NC device 10 is overwritten with the edited NC program to store the edited NC program into the NC device 10.

It is noted that, in the case where a plurality of stable rotation numbers $n_i$ are calculated by the stable rotation number calculator 25, the NC program editor 42 may correct the corresponding spindle rotation number in the NC program to the largest one of the stable rotation numbers $n_i$ or to a stable rotation number which is freely selected from the rotation numbers.

Thus, according to the NC program editing apparatus 40 of the present embodiment, in the case where a spindle rotation number set in an NC program is a rotation number that causes regenerative chatter vibration, the spindle rotation number is automatically corrected to a stable rotation number by the NC program editor 42; therefore, an appropriate NC program that does not cause regenerative chatter vibration can be automatically obtained without bothering an operator and the NC program is prevented from remaining uncorrected. Therefore, when machining is performed using the NC program thereafter, the machining is certainly stable.

Although specific embodiments of the present disclosure have been described above, the present disclosure is not limited thereto and can be implemented as other embodiments.

For example, although, in the above embodiments, the spindle rotation controller 24 is configured to gradually decrease the spindle rotation number when regenerative chatter vibration has been detected by the regenerative chatter detector 23, the present disclosure is not limited thereto and the spindle rotation controller 24 may be configured to gradually increase the spindle rotation number when regenerative chatter vibration has been detected by the regenerative chatter detector 23. As seen from FIG. 4(b), the spindle rotation number at which the variation of the vibration frequency exceeds the predetermined reference value can be also checked by gradually increasing the spindle rotation number. Therefore, also when the spindle rotation controller 24 is configured to gradually increase the spindle rotation number, a stable rotation number $n_i$ can be calculated by the stable rotation number calculator 25. It is noted that, in this case, the stable rotation number calculator 25 is configured to calculate a stable rotation number $n_i$ as a candidate in accordance with Equations 1 and 2 above based on a vibration frequency immediately after the variation of the vibration frequency exceeded the predetermined reference value.

Further, the spindle rotation controller 24 may be configured to, in the case where a plurality of stable rotation numbers $n_i$ are calculated by the stable rotation number calculator 25, sequentially correct the spindle rotation number for cutting in order starting with the smallest one of the calculated stable rotation numbers while referring to the results of the detection by the regenerative chatter detector 23. The stable rotation number $n_i$ is a spindle rotation number that does not cause regenerative chatter vibration; therefore, taking into account machining efficiency, it is preferred that the spindle rotation number is corrected to the largest stable rotation number $n_i$. However, if the spindle rotation number is suddenly corrected to the largest stable rotation number $n_i$, an unexpected defect can occur; therefore, it is preferred that the spindle rotation number is sequentially corrected in order starting with the smallest one of the calculated stable rotation numbers while referring to the results of the detection by the regenerative chatter detector 23. Also in this configuration, it is possible to appropriately eliminate regenerative chatter vibration without lowering machining efficiency.

Further, although the stable rotation number calculator 25 is configured to calculate a plurality of stable rotation numbers $n_i$ as candidates in accordance with Equations 1 and 2 above, the present disclosure is not limited thereto and the stable rotation number calculator 25 may be configured to simply determine a spindle rotation number at which the variation of the vibration frequency of the tool T exceeds the predetermined reference value to be a stable rotation number. In a case where machining efficiency is not regarded as important, regenerative chatter vibration can be eliminated also by this configuration.

Further, although, in the above embodiments, the informing device 35 is composed of a display, the present disclosure is not limited thereto and the informing device 35 may be composed of an audio output device, such as a speaker. In this case, the informing controller 26 is configured to control the audio output device.

Further, although, in the above embodiments, the data on the vibration caused by the tool T is obtained using the acceleration sensor 30 attached to the spindle 5, the present disclosure is not limited thereto and the vibration data may be obtained by, for example, arranging a microphone at an upper position in the machining area of the NC machine tool and collecting cutting sounds during cutting by the microphone. Because the cutting sounds are caused by vibration of the tool T, the vibration state of the tool T can be detected by analyzing the cutting sounds.

What is claimed is:

1. A method of calculating a stable spindle rotation number capable of suppressing regenerative chatter vibration in cutting using a machine tool, comprising:
   a vibration frequency calculating process of calculating a vibration frequency of a tool by obtaining data on vibration caused by the tool in cutting and analyzing the obtained vibration data;
   a regenerative chatter detecting process of comparing the vibration frequency of the tool calculated in the vibration frequency calculating process with a spindle rotation frequency band, and at least when the vibration frequency of the tool is out of the spindle rotation frequency band, determining that regenerative chatter vibration occurs in the tool, the spindle rotation frequency band being obtained by adding a predetermined margin to a frequency corresponding to a product of multiplication of a spindle rotation number and the number of teeth of the tool;
   a rotation number changing process of gradually decreasing or increasing the spindle rotation number in a case where occurrence of regenerative chatter vibration is detected in the regenerative chatter detecting process; and
   a stable rotation number calculating process of monitoring variation of the vibration frequency of the tool calculated in the vibration frequency calculating process varied in accordance with the spindle rotation number changed in the rotation number changing process, and determining a spindle rotation number when the variation of the vibration frequency exceeds a predetermined reference value to be a stable spindle rotation number.

2. The method according to claim 1, wherein the stable rotation number calculating process further comprises approximately calculating a positive integer $i_b$ and then calculating a stable rotation number $n_1$ based on a positive integer i equal to or smaller than the calculated integer $i_b$ in accordance with following equations:

$$i_b = (f \times 60)/(n \times N);\text{ and}$$

$$n_i = (f \times 60)/(N \times i),$$

where f [Hz] is a vibration frequency immediately before the variation of the vibration frequency exceeds the predetermined reference value in the case where the spindle rotation number is gradually decreased in the rotation number changing process, or a vibration frequency immediately after the variation of the vibration frequency exceeds the predetermined reference value in the case where the spindle rotation number is gradually increased in the rotation number changing process, n [min$^{-1}$] is a spindle rotation number when the variation of the vibration frequency exceeds the predetermined reference value, and N is the number of teeth of the tool.

3. A method of informing an operator of a stable spindle rotation number capable of suppressing regenerative chatter vibration in cutting using a machine tool, comprising:

a vibration frequency calculating process of calculating a vibration frequency of a tool by obtaining data on vibration caused by the tool in cutting and analyzing the obtained vibration data;

a regenerative chatter detecting process of comparing the vibration frequency of the tool calculated in the vibration frequency calculating process with a spindle rotation frequency band, and at least when the vibration frequency of the tool is out of the spindle rotation frequency band, determining that regenerative chatter vibration occurs in the tool, the spindle rotation frequency band being obtained by adding a predetermined margin to a frequency corresponding to a product of multiplication of a spindle rotation number and the number of teeth of the tool;

a rotation number changing process of gradually decreasing or increasing the spindle rotation number in a case where occurrence of regenerative chatter vibration is detected in the regenerative chatter detecting process;

a stable rotation number calculating process of monitoring variation of the vibration frequency of the tool calculated in the vibration frequency calculating process varied in accordance with the spindle rotation number changed in the rotation number changing process, and determining a spindle rotation number when the variation of the vibration frequency exceeds a predetermined reference value to be a stable spindle rotation number; and an informing process of informing the operator of the stable rotation number calculated in the stable rotation number calculating process.

4. A method of controlling a spindle rotation number to a stable rotation number capable of suppressing regenerative chatter vibration of a tool in cutting using a machine tool, comprising:

a vibration frequency calculating process of calculating a vibration frequency of a tool by obtaining data on vibration caused by the tool in cutting and analyzing the obtained vibration data;

a regenerative chatter detecting process of comparing the vibration frequency of the tool calculated in the vibration frequency calculating process with a spindle rotation frequency band, and at least when the vibration frequency of the tool is out of the spindle rotation frequency band, determining that regenerative chatter vibration occurs in the tool, the spindle rotation frequency band being obtained by adding a predetermined margin to a frequency corresponding to a product of multiplication of the spindle rotation number and the number of teeth of the tool;

a rotation number changing process of gradually decreasing or increasing the spindle rotation number in a case where occurrence of regenerative chatter vibration is detected in the regenerative chatter detecting process;

a stable rotation number calculating process of monitoring variation of the vibration frequency of the tool calculated in the vibration frequency calculating process varied in accordance with the spindle rotation number changed in the rotation number changing process, and determining a spindle rotation number when the variation of the vibration frequency exceeds a predetermined reference value to be a stable spindle rotation number; and a rotation number correcting process of correcting the spindle rotation number in cutting to the stable rotation number calculated in the stable rotation number calculating process.

5. The method according to claim 4, wherein:

in a case where a plurality of stable rotation numbers are calculated in the stable rotation number calculating process, the spindle rotation number in cutting is corrected to the largest one of the calculated stable rotation numbers in the rotation number correcting process.

6. The method according to claim 4, wherein:

in a case where a plurality of stable rotation numbers are calculated in the stable rotation number calculating process, the spindle rotation number in cutting is sequentially corrected in order starting with the smallest one of the calculated stable rotation numbers with reference to detection results in the regenerative chatter detecting process in the rotation number correcting process.

7. An NC program editing method of correcting a spindle rotation number set in an NC program to a stable rotation number capable of suppressing regenerative chatter vibration of a tool in cutting on a numerically controlled machine tool using the NC program, comprising:

a vibration frequency calculating process of calculating a vibration frequency of a tool by obtaining data on vibration caused by the tool in cutting and analyzing the obtained vibration data;

a regenerative chatter detecting process of comparing the vibration frequency of the tool calculated in the vibration frequency calculating process with a spindle rotation frequency band, and at least when the vibration frequency of the tool is out of the spindle rotation frequency band, determining that regenerative chatter vibration occurs in the tool, the spindle rotation frequency band being obtained by adding a predetermined margin to a frequency corresponding to a product of multiplication of a spindle rotation number and the number of teeth of the tool;

a rotation number changing process of gradually decreasing or increasing the spindle rotation number in a case where occurrence of regenerative chatter vibration is detected in the regenerative chatter detecting process;

a stable rotation number calculating process of monitoring variation of the vibration frequency of the tool calculated in the vibration frequency calculating process varied in accordance with the spindle rotation number changed in the rotation number changing process, and determining a spindle rotation number when the variation of the vibration frequency exceeds a predetermined reference value to be a stable spindle rotation number; and an NC program editing process of changing the spindle rotation number set in the NC program to the stable rotation number calculated in the stable rotation number calculating process.

8. An apparatus for calculating a stable spindle rotation number capable of suppressing regenerative chatter vibration in cutting using a machine tool, comprising:
   a vibration data obtainer obtaining data on vibration caused by a tool in cutting;
   a vibration frequency calculator calculating a vibration frequency of the tool by analyzing the vibration data obtained by the vibration data obtainer;
   a regenerative chatter detector comparing the vibration frequency of the tool calculated by the vibration frequency calculator with a spindle rotation frequency band, and at least when the vibration frequency of the tool is out of the spindle rotation frequency band, determining that regenerative chatter vibration occurs in the tool, the spindle rotation frequency band being obtained by adding a predetermined margin to a frequency corresponding to a product of multiplication of a spindle rotation number and the number of teeth of the tool;
   a spindle rotation controller gradually decreasing or increasing the spindle rotation number in a case where occurrence of regenerative chatter vibration is detected by the regenerative chatter detector; and
   a stable rotation number calculator monitoring variation of the vibration frequency of the tool calculated by the vibration frequency calculator varied in accordance with the spindle rotation number changed by the spindle rotation controller, and determining a spindle rotation number when the variation of the vibration frequency exceeds a predetermined reference value to be a stable spindle rotation number.

9. The apparatus according to claim 8, wherein the stable rotation number calculator is further configured to approximately calculate a positive integer $i_b$ and then calculate a stable rotation number $n_i$ based on a positive integer i equal to or smaller than the calculated integer $i_b$ in accordance with following equations:

$$i_b = (f \times 60)/(n \times N); \text{ and}$$

$$n_i = (f \times 60)/(N \times i),$$

where f [Hz] is a vibration frequency immediately before the variation of the vibration frequency exceeds the predetermined reference value in the case where the spindle rotation number is gradually decreased by the spindle rotation controller, or a vibration frequency immediately after the variation of the vibration frequency exceeds the predetermined reference value in the case where the spindle rotation number is gradually increased by the spindle rotation controller, n [min$^{-1}$] is a spindle rotation number when the variation of the vibration frequency exceeds the predetermined reference value, and N is the number of teeth of the tool.

10. The apparatus according to claim 8, further comprising an informer informing an operator of the stable rotation number calculated by the stable rotation number calculator.

11. An apparatus for controlling a spindle rotation number to a stable rotation number capable of suppressing regenerative chatter vibration of a tool in cutting using a machine tool, comprising:
   a vibration data obtainer obtaining data on vibration caused by the tool in cutting;
   a vibration frequency calculator calculating a vibration frequency of the tool by analyzing the vibration data obtained by the vibration data obtainer;
   a regenerative chatter detector comparing the vibration frequency of the tool calculated by the vibration frequency calculator with a spindle rotation frequency band, and at least when the vibration frequency of the tool is out of the spindle rotation frequency band, determining that regenerative chatter vibration occurs in the tool, the spindle rotation frequency band being obtained by adding a predetermined margin to a frequency corresponding to a product of multiplication of the spindle rotation number and the number of teeth of the tool;
   a spindle rotation controller gradually decreasing or increasing the spindle rotation number in a case where occurrence of regenerative chatter vibration is detected by the regenerative chatter detector; and
   a stable rotation number calculator monitoring variation of the vibration frequency of the tool calculated by the vibration frequency calculator varied in accordance with the spindle rotation number changed by the spindle rotation controller, and determining a spindle rotation number when the variation of the vibration frequency exceeds a predetermined reference value to be a stable spindle rotation number,
   the spindle rotation controller being further configured to correct the spindle rotation number in cutting to the stable rotation number calculated by the stable rotation number calculator.

12. The apparatus according to claim 11, wherein the spindle rotation controller is configured to, in a case where a plurality of stable rotation numbers are calculated by the stable rotation number calculator, correct the spindle rotation number in cutting to the largest one of the calculated stable rotation numbers.

13. The apparatus according to claim 11, wherein the spindle rotation controller is configured to, in a case where a plurality of stable rotation numbers are calculated by the stable rotation number calculator, sequentially correct the spindle rotation number in cutting in order starting with the smallest one of the calculated stable rotation numbers while referring to results of the detection by the regenerative chatter detector.

14. An NC program editing apparatus correcting a spindle rotation number set in an NC program to a stable rotation number capable of suppressing regenerative chatter vibration of a tool in cutting on a numerically controlled machine tool using the NC program, comprising:
   a vibration data obtainer obtaining data on vibration caused by the tool in cutting;
   a vibration frequency calculator calculating a vibration frequency of the tool by analyzing the vibration data obtained by the vibration data obtainer;
   a regenerative chatter detector comparing the vibration frequency of the tool calculated by the vibration frequency calculator with a spindle rotation frequency band, and at least when the vibration frequency of the tool is out of the spindle rotation frequency band, determining that regenerative chatter vibration occurs in the tool, the spindle rotation frequency band being obtained by adding a predetermined margin to a frequency corresponding to a product of multiplication of the spindle rotation number and the number of teeth of the tool;

- a spindle rotation controller gradually decreasing or increasing the spindle rotation number in a case where occurrence of regenerative chatter vibration is detected by the regenerative chatter detector;
- a stable rotation number calculator monitoring variation of the vibration frequency of the tool calculated by the vibration frequency calculator varied in accordance with the spindle rotation number changed by the spindle rotation controller, and determining a spindle rotation number when the variation of the vibration frequency exceeds a predetermined reference value to be a stable spindle rotation number; and
- an NC program editor correcting the spindle rotation number set in the NC program to the stable rotation number calculated by the stable rotation number calculator.

* * * * *